US012596892B2

(12) United States Patent
Doggett

(10) Patent No.: US 12,596,892 B2
(45) Date of Patent: Apr. 7, 2026

(54) MACHINE TRANSLATION SYSTEM FOR ENTERTAINMENT AND MEDIA

(71) Applicant: DISNEY ENTERPRISES, INC., Burbank, CA (US)

(72) Inventor: Erika Doggett, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 209 days.

(21) Appl. No.: 18/385,484

(22) Filed: Oct. 31, 2023

(65) Prior Publication Data

US 2024/0062022 A1     Feb. 22, 2024

Related U.S. Application Data

(62) Division of application No. 16/052,478, filed on Aug. 1, 2018, now Pat. No. 11,847,425.

(51) Int. Cl.
| | |
|---|---|
| *G06F 40/58* | (2020.01) |
| *G06F 3/16* | (2006.01) |
| *G06F 40/205* | (2020.01) |
| *G06F 40/40* | (2020.01) |
| *G06F 40/51* | (2020.01) |

(Continued)

(52) U.S. Cl.
CPC .............. *G06F 40/58* (2020.01); *G06F 3/167* (2013.01); *G06F 40/205* (2020.01); *G06F 40/40* (2020.01); *G06F 40/51* (2020.01); *G06F 40/55* (2020.01); *G10L 15/1822* (2013.01); *G10L 15/22* (2013.01); *G10L 15/26* (2013.01);

(Continued)

(58) Field of Classification Search
CPC ... G10L 2021/105; G10L 21/10; G10L 15/26; G10L 25/57; G10L 15/22; G06F 40/40; G06F 40/58; G06F 40/51; G06F 40/55
See application file for complete search history.

(56) References Cited

U.S. PATENT DOCUMENTS

| | | | | |
|---|---|---|---|---|
| 5,295,068 A * | 3/1994 | Nishino | ................ | G06F 40/242 |
| | | | | 704/10 |
| 9,104,661 B1 * | 8/2015 | Evans | ..................... | G06F 40/58 |

(Continued)

FOREIGN PATENT DOCUMENTS

| | | |
|---|---|---|
| GB | 2510116 A | 7/2014 |
| WO | 2004090746 A1 | 10/2004 |

OTHER PUBLICATIONS

Partial European search report for Application No. 19175423.3, dated Nov. 13, 2019.

(Continued)

*Primary Examiner* — Samuel G Neway
(74) *Attorney, Agent, or Firm* — Dorsey & Whitney LLP

(57) ABSTRACT

Techniques for generating translated audio output based on media content are disclosed. Text is accessed corresponding to media content. One or more untranslated mouth shape indicia are determined based on the text. The text is parsed into one or more text chunks when one or more dubbing parameters are met. The parsed text is translated from a first spoken language to a second spoken language. One or more translated mouth shape indicia are determined. The one or more translated mouth shape indicia and the one or more untranslated mouth shape indicia are compared based on a predetermined tolerance threshold. A translated audio output is generated based on the translated text.

20 Claims, 8 Drawing Sheets

(51) Int. Cl.

| | |
|---|---|
| *G06F 40/55* | (2020.01) |
| *G10L 15/18* | (2013.01) |
| *G10L 15/22* | (2006.01) |
| *G10L 15/26* | (2006.01) |
| *G10L 21/00* | (2013.01) |
| *G10L 21/10* | (2013.01) |
| *G10L 25/57* | (2013.01) |

(52) U.S. Cl.
CPC .............. *G10L 21/00* (2013.01); *G10L 25/57* (2013.01); *G10L 2021/105* (2013.01)

(56) References Cited

U.S. PATENT DOCUMENTS

| | | | | |
|---|---|---|---|---|
| 9,324,340 | B2 * | 4/2016 | McCoy ................... G10L 21/10 |
| 9,442,923 | B1 | 9/2016 | Abou Mahmoud et al. |
| 9,916,305 | B1 * | 3/2018 | Ayan ...................... G06F 40/58 |
| 2001/0029455 | A1 * | 10/2001 | Chin ........................ G06F 40/58 |
| | | | | 704/277 |
| 2002/0097380 | A1 * | 7/2002 | Moulton .............. G11B 27/022 |
| | | | | 704/E21.02 |
| 2002/0161579 | A1 * | 10/2002 | Saindon .................. G10L 15/26 |
| | | | | 704/235 |
| 2003/0126559 | A1 * | 7/2003 | Fuhrmann ............... G06F 40/40 |
| | | | | 717/137 |
| 2005/0267738 | A1 * | 12/2005 | Wilkinson ........... G06Q 10/107 |
| | | | | 704/9 |
| 2006/0217954 | A1 * | 9/2006 | Koyama ................. G06F 40/58 |
| | | | | 704/2 |
| 2006/0241932 | A1 * | 10/2006 | Carman ................ G06F 40/226 |
| | | | | 704/2 |
| 2006/0285654 | A1 * | 12/2006 | Nesvadba ...... H04N 21/440236 |
| | | | | 348/E5.122 |
| 2008/0052069 | A1 * | 2/2008 | Flanagan ................ G06F 40/58 |
| | | | | 704/235 |
| 2008/0129865 | A1 * | 6/2008 | Leonard ................. G11B 27/10 |
| | | | | 348/E7.001 |

| | | | | |
|---|---|---|---|---|
| 2008/0215309 | A1 * | 9/2008 | Weischedel ............. G06F 40/58 |
| | | | | 704/3 |
| 2010/0332214 | A1 * | 12/2010 | Shpalter ............. H04N 21/4884 |
| | | | | 382/176 |
| 2011/0246172 | A1 * | 10/2011 | Liberman ............... H04M 3/56 |
| | | | | 348/14.09 |
| 2012/0116750 | A1 * | 5/2012 | Onishi .................... G06F 40/58 |
| | | | | 704/3 |
| 2012/0316860 | A1 * | 12/2012 | Reitan .................. H04N 9/8233 |
| | | | | 386/245 |
| 2013/0117793 | A1 * | 5/2013 | Yang ....................... G06F 40/58 |
| | | | | 725/110 |
| 2013/0272672 | A1 * | 10/2013 | Padro Rondon ... H04N 21/4325 |
| | | | | 386/201 |
| 2014/0125558 | A1 * | 5/2014 | Miyajima ........... G02B 27/017 |
| | | | | 345/8 |
| 2014/0208351 | A1 * | 7/2014 | Moore .............. H04N 21/4314 |
| | | | | 725/35 |
| 2014/0288946 | A1 * | 9/2014 | Shinohara .............. G06F 40/53 |
| | | | | 705/2 |
| 2016/0021334 | A1 * | 1/2016 | Rossano .............. G10L 13/033 |
| | | | | 704/2 |
| 2016/0295132 | A1 * | 10/2016 | Burgess ................. G11B 27/28 |
| 2017/0147559 | A1 * | 5/2017 | Abou Mahmoud .... G06F 40/42 |
| 2017/0371868 | A1 * | 12/2017 | Zhang .................... G06F 40/44 |
| 2018/0143974 | A1 * | 5/2018 | Skarbovsky ........... G06F 40/58 |
| 2018/0189249 | A1 * | 7/2018 | Berman ................. G06F 40/166 |
| 2018/0232363 | A1 | 8/2018 | Jin et al. |
| 2019/0215580 | A1 * | 7/2019 | Parthasarathi ......... G06F 40/47 |
| 2019/0228805 | A1 * | 7/2019 | Jin ....................... G11B 27/031 |
| 2020/0042601 | A1 * | 2/2020 | Doggett ............. H04N 21/4884 |
| 2020/0404386 | A1 * | 12/2020 | Mccartney, Jr. ........ G06F 40/58 |
| 2024/0062022 | A1 * | 2/2024 | Doggett ......... H04N 21/440236 |

OTHER PUBLICATIONS

Extended European Search Report for application No. 19175423.3 dated Mar. 23, 2020.

* cited by examiner

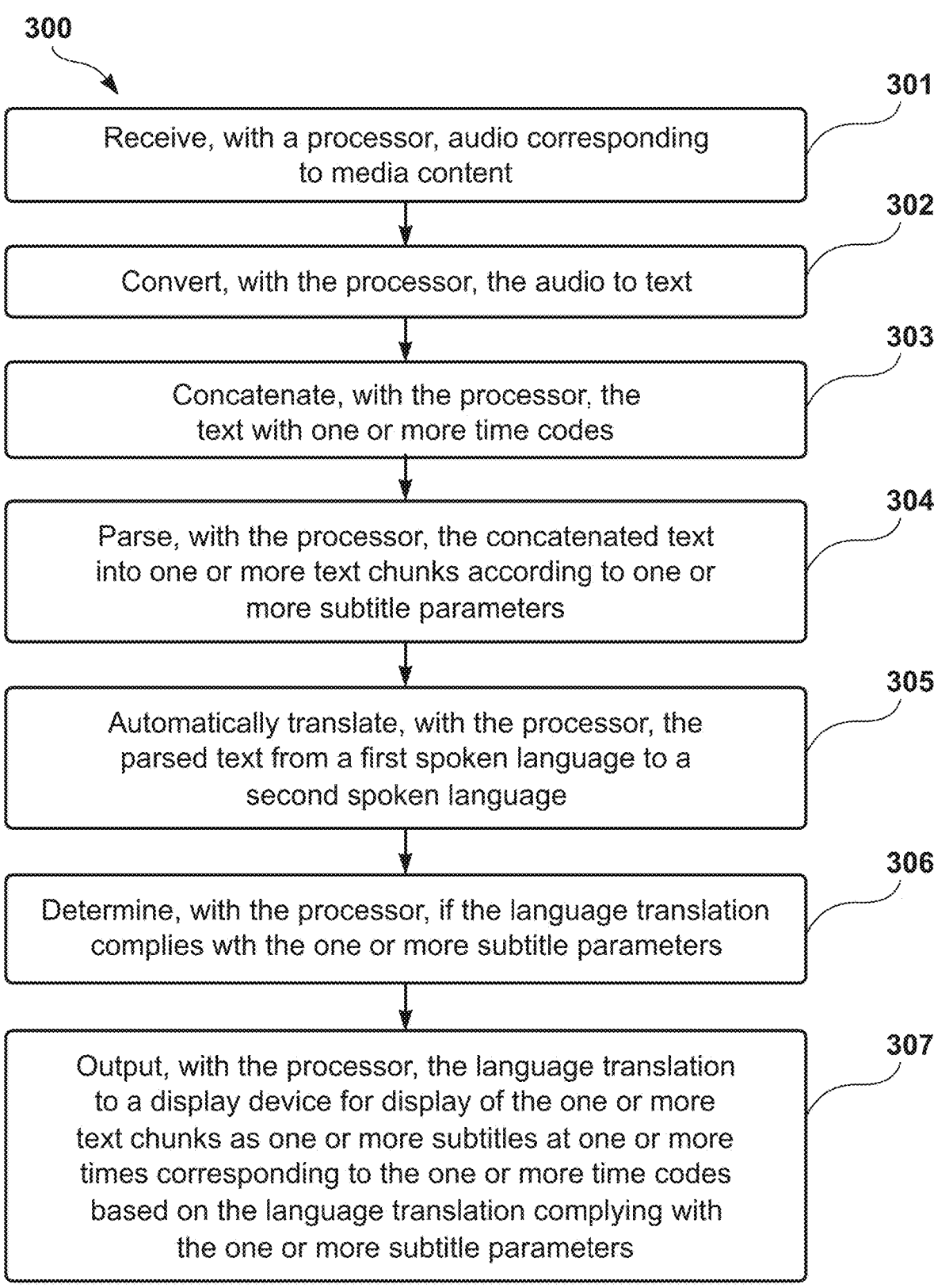

300

301
Receive, with a processor, audio corresponding to media content

302
Convert, with the processor, the audio to text

303
Concatenate, with the processor, the text with one or more time codes

304
Parse, with the processor, the concatenated text into one or more text chunks according to one or more subtitle parameters 305
Automatically translate, with the processor, the parsed text from a first spoken language to a second spoken language 306
Determine, with the processor, if the language translation complies wth the one or more subtitle parameters 307
Output, with the processor, the language translation to a display device for display of the one or more text chunks as one or more subtitles at one or more times corresponding to the one or more time codes based on the language translation complying with the one or more subtitle parameters

FIG. 3

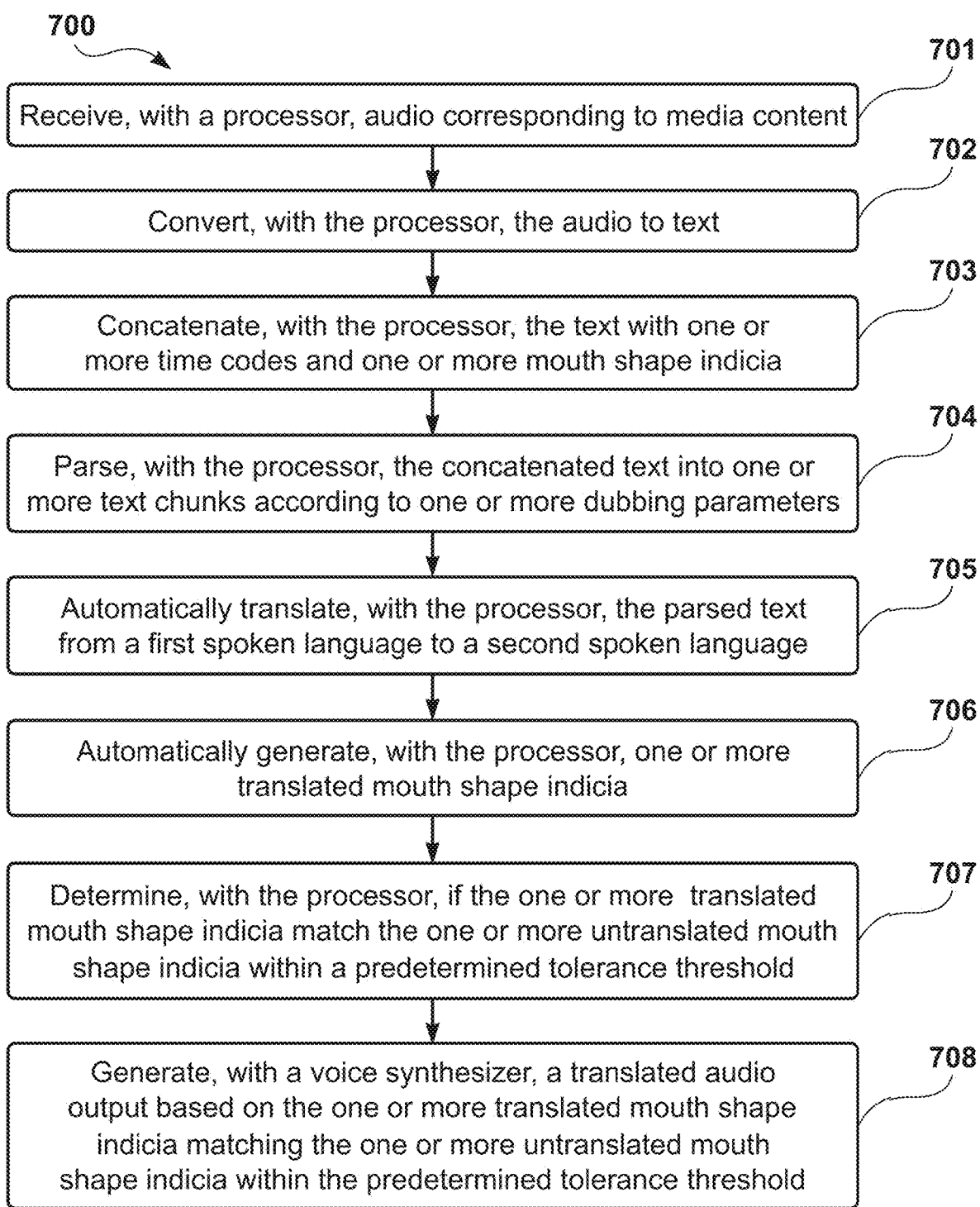

700

701
Receive, with a processor, audio corresponding to media content

702
Convert, with the processor, the audio to text

703
Concatenate, with the processor, the text with one or more time codes and one or more mouth shape indicia 704
Parse, with the processor, the concatenated text into one or more text chunks according to one or more dubbing parameters 705
Automatically translate, with the processor, the parsed text from a first spoken language to a second spoken language 706
Automatically generate, with the processor, one or more translated mouth shape indicia 707
Determine, with the processor, if the one or more translated mouth shape indicia match the one or more untranslated mouth shape indicia within a predetermined tolerance threshold 708
Generate, with a voice synthesizer, a translated audio output based on the one or more translated mouth shape indicia matching the one or more untranslated mouth shape indicia within the predetermined tolerance threshold

FIG. 7

MACHINE TRANSLATION SYSTEM FOR ENTERTAINMENT AND MEDIA

CROSS REFERENCE TO RELATED APPLICATION

This application is a divisional of the Applicant's U.S. patent application Ser. No. 16/052,478, filed on Aug. 1, 2018, titled "Machine Translation System for Entertainment and Media", which is hereby incorporated by reference in its entirety for all purposes.

BACKGROUND

1. Field

This disclosure generally relates to the field of language translation.

2. General Background

Conventional machine translation systems typically allow for computerized translation from text and/or audio in a first language (e.g., English) into text and/or audio of a second language (e.g., Spanish). For example, some machine translation systems allow for a word-for-word translation from a first language into a second language. Yet, such systems typically focus only on pure linguistic translation.

SUMMARY

In one aspect, a computer program product comprises a non-transitory computer readable storage device having a computer readable program stored thereon. The computer readable program when executed on a computer causes the computer to receive, with a processor, audio corresponding to media content. Further, the computer is caused to convert, with the processor, the audio to text. In addition, the computer is caused to concatenate, with the processor, the text with one or more time codes. The computer is also caused to parse, with the processor, the concatenated text into one or more text chunks according to one or more subtitle parameters. Further, the computer is caused to automatically translate, with the processor, the parsed text from a first spoken language to a second spoken language. Moreover, the computer is caused to determine, with the processor, if the language translation complies with the one or more subtitle parameters. Additionally, the computer is caused to output, with the processor, the language translation to a display device for display of the one or more text chunks as one or more subtitles at one or more times corresponding to the one or more time codes based on the language translation complying with the one or more subtitle parameters.

In another aspect, a computer program product comprises a non-transitory computer readable storage device having a computer readable program stored thereon. The computer readable program when executed on a computer causes the computer to receive, with a processor, audio corresponding to media content. Further, the computer is caused to convert, with the processor, the audio to text. In addition, the computer is caused to concatenate, with the processor, the text with one or more time codes and one or more untranslated mouth shape indicia. Moreover, the computer is caused to parse, with the processor, the concatenated text into one or more text chunks according to one or more dubbing parameters. The computer is also caused to automatically translate, with the processor, the parsed text from a first spoken language to a second spoken language. Further, the computer is caused to automatically generate, with the processor, one or more translated mouth shape indicia. In addition, the computer is caused to determine, with the processor, if the one or more translated mouth shape indicia match the one or more untranslated mouth shape indicia within a predetermined tolerance threshold. Further, the computer is caused to generate, with a voice synthesizer, a translated audio output based on the one or more translated mouth shape indicia matching the one or more untranslated mouth shape indicia within the predetermined tolerance threshold. In addition, the computer is caused to generate, with the processor, a video output based on the one or more translated mouth shape indicia.

In another aspect, an apparatus has a processor that performs the functionality of the aforementioned computer readable programs. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which:

FIG. 3 illustrates a process that may be used by the subtitle language translation configuration illustrated in FIG. 2 to perform a language translation.

FIG. 7 illustrates a process that may be used by the dubbing translation configuration to automatically generate a machine language translation as dubbing for media content.

DETAILED DESCRIPTION

A machine translation system is provided to perform a language translation and adjust the language translation for entertainment-specific parameters. The machine translation system may use an automated pipeline to receive an input (e.g., text and/or audio) in a first language and output a translation that is adjusted for the entertainment-specific parameters. The automated pipeline may be computerized to minimize, or completely avoid, human involvement. In one aspect, the machine translation system is configured according to a subtitle configuration. In another aspect, the machine translation system is configured according to a dubbing configuration.

Figure 1:
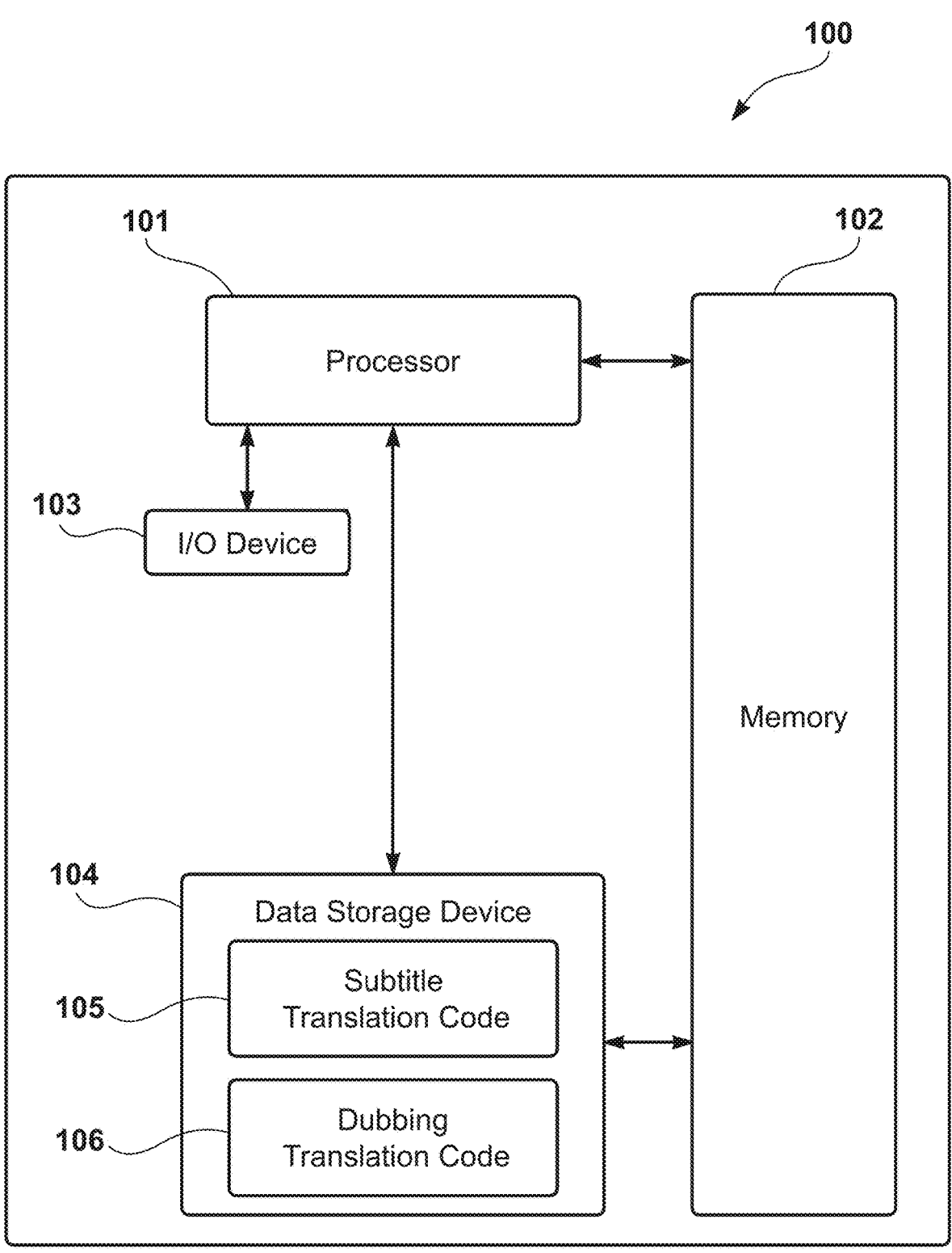
FIG. 1 illustrates a block diagram of the internal components of a language translation system that is used to automatically generate a language translation based on one or more entertainment-specific parameters.

FIG. 1 illustrates a block diagram of the internal components of a language translation system 100 that is used to automatically generate a language translation based on one or more entertainment-specific parameters. The language translation system 100 has a processor 101, a memory 102, an input/output ("I/O") device 103 (e.g., microphone, keyboard, mouse, pointing device, camera, display device, etc.), and a data storage device 104.

Further, the data storage device 104 stores thereon subtitle translation code 105 and/or dubbing translation code 106. The processor 101 executes the subtitle translation code 105 to automatically generate a machine translation according to one or more subtitle parameters (e.g. space requirements associated with the amount of text that may be displayed within an image frame, timing requirements associated with the speed at which humans may comfortably read the amount of displayed text, etc.). Further, the processor 101 executes the dubbing translation code 106 to automatically generate a machine translation according to one or more dubbing parameters (e.g., mouth shape matching requirements that entail the sounds of the translated language to match the mouth shapes of the untranslated language in a substantially similar manner).

Previous machine translation systems were directed to general consumer translations, which could not be practically applied in the entertainment and media contexts. For example, a general machine translation system applied to a movie with subtitles could easily result in translated text not fitting on the display screen, subtitles disappearing too quickly before a viewer could comfortably read the subtitles, etc. Similarly, a word-for-word translation generated for a movie with dubbing could easily result in dubbing that appears unrealistic (e.g., an actor appearing to speak the translated language with a mouth shape that does not coincide with the word being spoken).

In contrast, the language translation system 100 improves the technology associated with automated language translation to generate language translations in entertainment-specific contexts (e.g., subtitles and dubbing). Rather than applying routine, conventional technology to perform language translation, the language translation system 100 performs a language translation according to one or more specific rules associated with one or more entertainment-specific parameters. Accordingly, the language translation system 100 generates a non-abstract result (e.g., translated media with subtitles and/or dubbing and adding the subtitles and/or dubbing to the video content) via an improvement to machine translation technology.

In one aspect, the language translation system 100 is a neural machine translation ("NMT") system. In another aspect, a different machine translation system is used to perform automated language translation.

Figure 2:
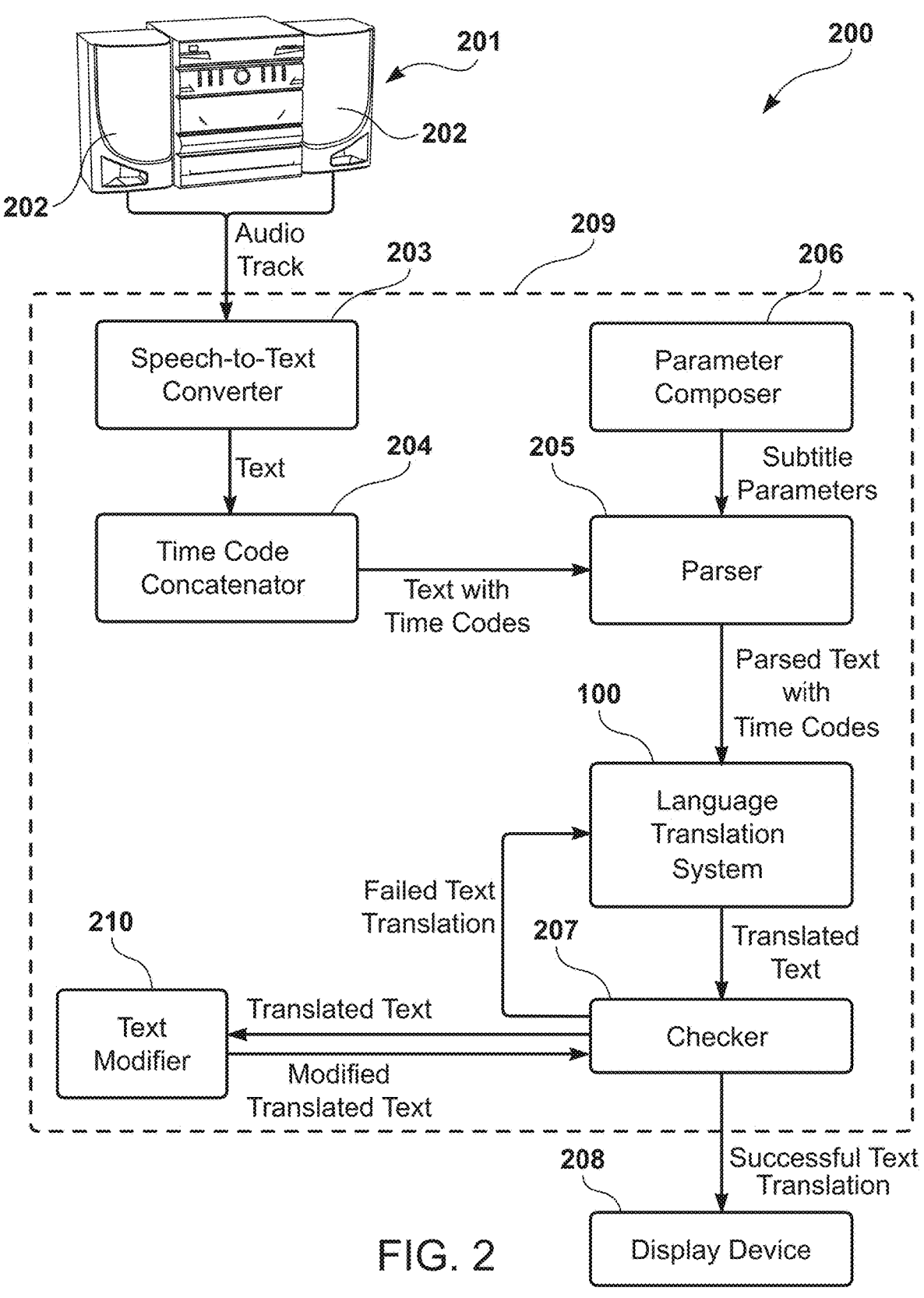
FIG. 2 illustrates a subtitle language translation configuration that uses the language translation system illustrated in FIG. 1 to automatically generate a machine language translation as one or more subtitles for media content.

FIG. 2 illustrates a subtitle language translation configuration 200 that uses the language translation system 100 illustrated in FIG. 1 to automatically generate a machine language translation as one or more subtitles for media content. A subtitle system 209, which may be a computing device with specialized instructions to generate subtitles for language translation in a media context, may receive an audio track from one or more output devices 202 (e.g., speakers) of an audio system 201.

The subtitle system 209 may receive the audio track at a speech-to-text converter 203, which converts the audio track into text. Further, the subtitle system 209 may use a time code concatenator 204 to concatenate the converted text with time code metadata so that the text is demarcated with one or more time codes indicating one or more times at which the text is played during the audio track.

Further, the time code concatenator 204 may then send the concatenated text and time codes to a parser 205. The parser 205 also receives one or more subtitle parameters from a parameter composer 206, which allows a machine or a user to generate one or more subtitle parameters specific to an entertainment context. For example, the subtitle parameters may indicate a threshold time to read a specific amount of words in the translated language, a maximum amount of space on the display screen that may be used to display the subtitle, etc. The parser 205 then parses the concatenated text and time codes according to the one or more subtitle parameters. As a result, the parser 205 outputs a plurality of text chunks with corresponding time codes.

The language translation system 100 then performs a language translation on the plurality of text chunks. A checker 207 then checks the translated text to ensure that each of the plurality of text chunks complies with the one or more subtitle parameters (e.g., space and/or timing requirements) in the translated language. If the checker 207 determines that the plurality of text chunks complies with the one or more subtitle parameters, the subtitle system 209 sends the plurality of text chunks to a display device 208 for rendering as one or more subtitles.

Conversely, if the checker 207 determines that the plurality of text chunks does not comply with the one or more subtitle parameters, the subtitle system 209 may initially send the translated text to a text modifier 210. Through one or more editing processes, the text modifier 210 may attempt to edit the translated text so that it complies with the one or more subtitle parameters. For example, the text modifier 210 may determine any time expansion availability (i.e., if the text may be displayed after an actor spoke to fill extra time resulting from the translation). As another example, the text modifier 210 may determine contraction availability (i.e., shortening of the translation) by removing certain words that lack significant meaning (e.g., "umm"). The text modifier 210 may then send the modified text to the checker 207 to determine if the modified text complies with the one or more subtitle parameters.

If the modified text still does not comply with the one or more subtitle parameters, the checker 207 may send an indication to the language translation system 100 that the text translation was a failure. The language translation system 100 may then retranslate the plurality of text chunks by expanding or contracting words within the translated text. For example, the language translation system 100 may search for words that are shorter, and synonymous, with words in the translated text to contract the retranslated text to comply with the one or more subtitle parameters.

In one aspect, a confidence score is generated for each of a plurality of potential retranslations. The language translation system 100 may then iterate (e.g., via a programmatic loop) through each of the plurality of potential retranslations, from the highest to lowest confidence score, until a re-translation is deemed to meet the one or more subtitle parameters.

If the checker 207 determines that the retranslated text still does not comply with the one or more subtitle parameters, the checker 207 may request that the language translation system 100 discard the translation and perform a new translation.

In an alternative aspect, the subtitle language translation configuration 200 may operate in conjunction with a human translator, rather than entirely automatically via a machine translator. For instance, the checker 207 may automatically highlight one or more portions of a translation for editing by a human translator to bring the translation within compliance of the one or more subtitle parameters.

In yet another alternative aspect, the subtitle language translation configuration 200 is not limited to receiving an audio input form the audio system 201. For instance, the subtitle language translation configuration 200 may receive a script in text form and perform parsing without the speech-to-text converter 203.

In another aspect, the subtitle language translation configuration 200 may enforce specific word translations according to a pre-approved dictionary. For example, the pre-approved dictionary may be a translation list for certain terms and phrases (e.g., corresponding to character names, fictional world references, etc.). The pre-approved dictionary allows for consistency of language usage across one or more entertainment contexts. Further, the checker 207, or an additional module, may check a translation word-by-word to determine if a word is in the pre-approved dictionary. If so, the subtitle language translation configuration 200 may automatically use that particular word from the pre-approved dictionary, or phrase containing the word, rather than sending it to the language translation system 100. Alternatively, the language translation system 100 may assign a weighted score to a word that is in the pre-approved dictionary rather than one that is not so that the language translation system 100 is more likely to select the word that is in the pre-approved dictionary.

FIG. 3 illustrates a process 300 that may be used by the subtitle language translation configuration 200 illustrated in FIG. 2 to perform a language translation. At a process block 301, the process 300 receives, with the processor 101 (FIG. 1), audio corresponding to media content. Further, at a process block 302, the process 300 converts, with the processor 101, the audio to text. In addition, at a process block 303, the process 300 concatenates, with the processor 101, the text with one or more time codes. In addition, at a process block 304, the process 300 parses, with the processor 101, the concatenated text into one or more text chunks according to one or more subtitle parameters. Moreover, at a process block 305, the process 300 automatically translates, with the processor 101, the parsed text from a first spoken language to a second spoken language. In addition, at a process block 306, the process 300 determines, with the processor 101, if the language translation complies with the one or more subtitle parameters. At a process block 307, the process 300 outputs, with the processor 101, the language translation to a display device for display of the one or more text chunks as one or more subtitles at one or more times corresponding to the one or more time codes based on the language translation complying with the one or more subtitle parameters.

Figure 4A:
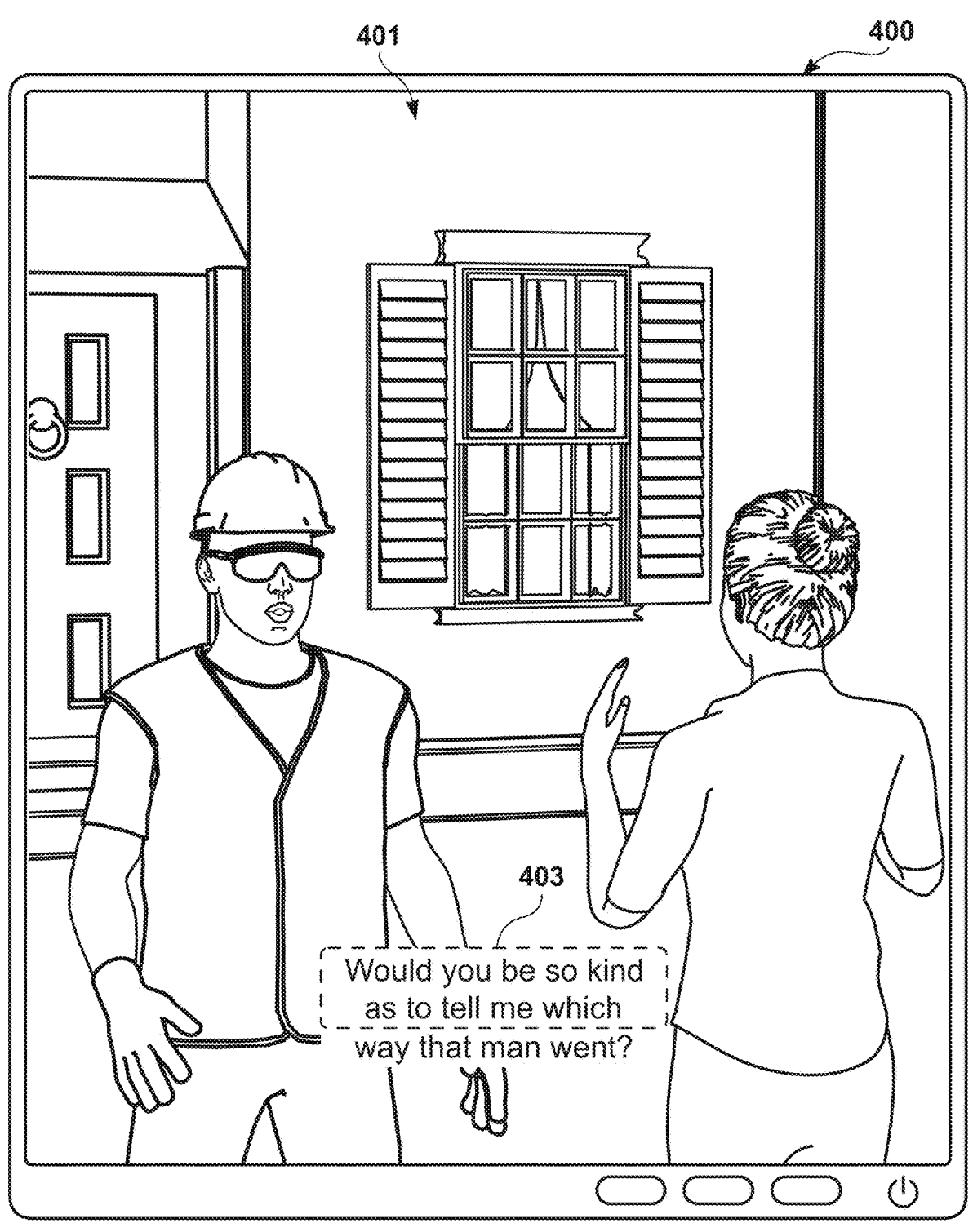
FIG. 4A illustrates an example of a screenshot of a failed translation displayed by a display device.

FIG. 4A illustrates an example of a screenshot 401 of a failed translation displayed by a display device 400 (e.g., television, projection screen, etc.). Although the subtitle language translation configuration 200 (FIG. 2) would prevent the screenshot 401 from being displayed, the screenshot 401 is illustrated to exemplify translated text that did not get fully displayed. For example, the illustrated phrase ("Would you be so kind as to tell me which way that man went?") exceeded a spacing requirements box 403 (depicted only for illustrative purposes). Because the portions of the subtitle appearing outside of the spacing requirements box 403 do not comply with the spacing requirements, the intended question would not be fully displayed. As a result, the original translation of the text may have been truncated when displayed by the display device 400.

Figure 4B:
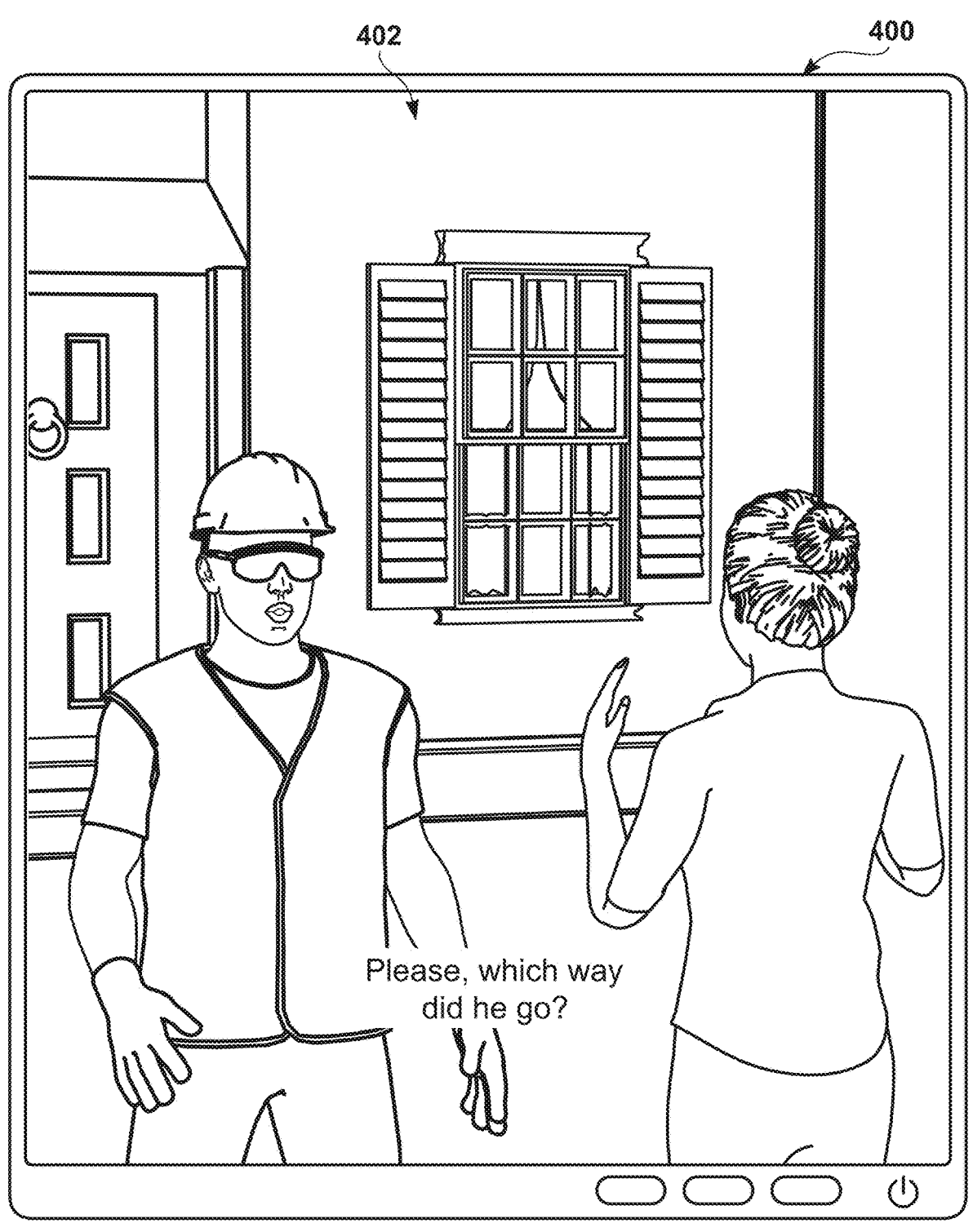
FIG. 4B illustrates an example of a screenshot of a successful translation displayed by the display device.

In contrast, FIG. 4B illustrates an example of a screenshot 402 of a successful translation displayed by the display device 400. For instance, the text modifier 210 illustrated in FIG. 2 may have modified the original text to replace certain words/phrases with other words/phrases that connote a substantially similar meaning. For instance, the modified phrase ("Please, which way did he go?") connotes the same, or a substantially similar meaning, to the original text, but would fit into the spacing requirements box 403 illustrated in FIG. 4A. As a result, the entirety of the translated question is displayed by the display device 400, as depicted by FIG. 4B. As another example, the dialogue between two actors may be truncated to by removing the lines of one of the actors to meet the spacing requirements.

Figure 5:
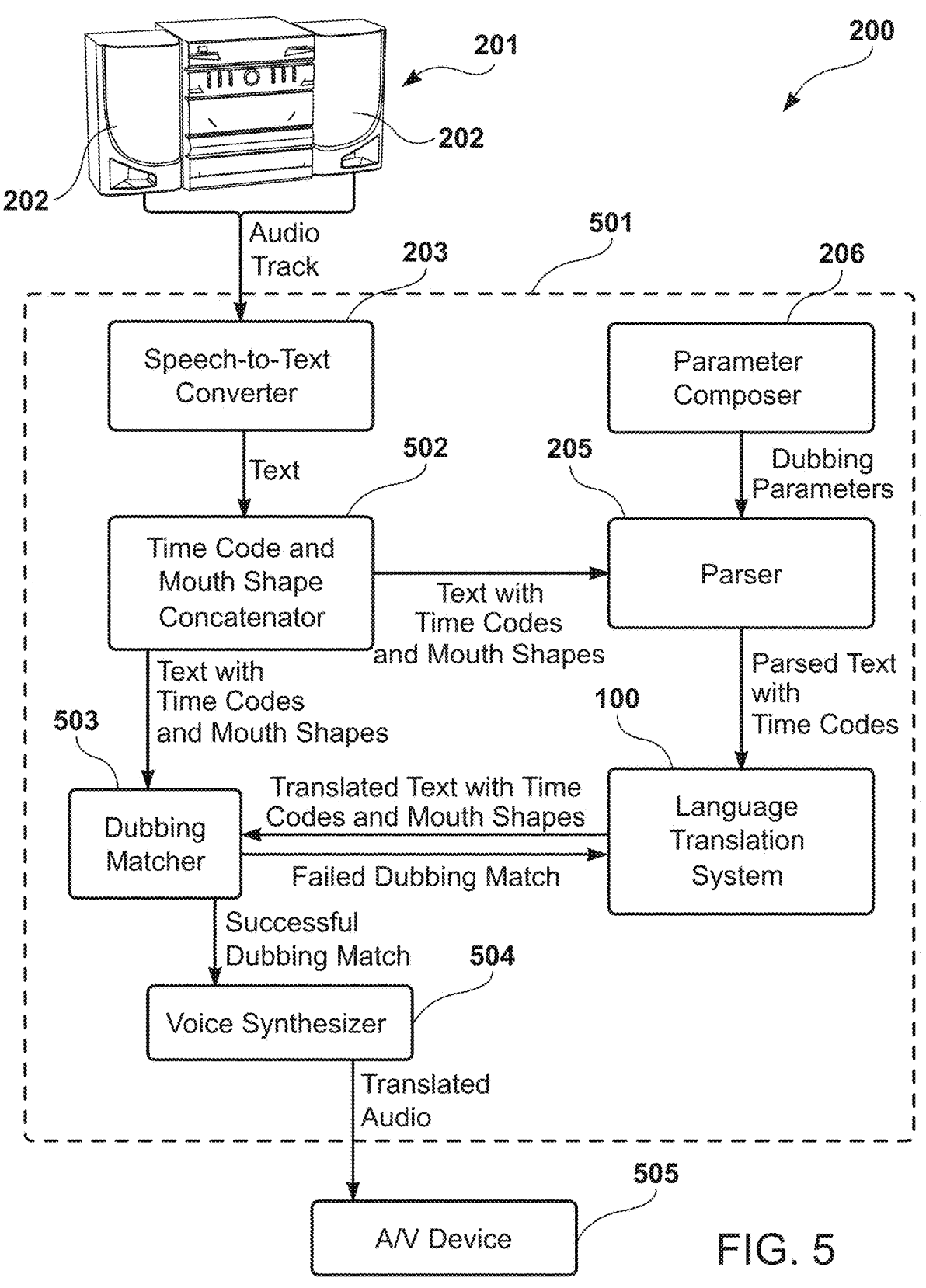
FIG. 5 illustrates a dubbing translation configuration that uses the language translation system illustrated in FIG. 1 to automatically generate a machine language translation as dubbing for media content.

FIG. 5 illustrates a dubbing translation configuration 500 that uses the language translation system 100 illustrated in FIG. 1 to automatically generate a machine language translation as dubbing for media content. A dubbing system 501, which may be a computing device with specialized instructions to generate dubbing (i.e., audio language translation in a second language that replaces the original audio in a first language) in a media context, may receive an audio track from the one or more output devices 202 (e.g., speakers) of the audio system 201.

The audio track may be converted to text via a speech-to-text converter 203. The text may be sent to a time code and mouth shape concatenator 502 that concatenates the text with mouth shape data (e.g., symbols/text indicating a particular mouth shape) and time code data for times in the audio at which the mouth shape would be displayed in corresponding video. The annotated text with time codes and mouth shapes is then sent to the parser 205 and a dubbing matcher 503.

The parser 205 parses the text based into one or more plurality of text chunks and corresponding time codes. The mouth shapes in the annotated text correspond to the untranslated language. The parser 205 may not use the mouth shape portion of the annotated text. Further, the parser 205 sends the linguistic portion, and corresponding time codes, of the annotated text to the language translation system 100, which performs a language translation of the linguistic portion of the annotated text and generates one or more mouth shape indicia (e.g., symbols/text) corresponding to the translated text at one or more times corresponding to one or more time codes. The language translation system 100 then sends the translated text, with the corresponding time codes and mouth shape indicia, to the dubbing matcher 503.

Further, the dubbing matcher 503 performs a comparison between the mouth shape indicia of the untranslated text and the translated text to determine if a match occurs within a predetermined tolerance threshold. In other words, the mouth shape (perceived, but not displayed) of the translated text may not be the exact the same as the translated text given the language translation, so deviation within a predetermined tolerance threshold is deemed to be a successful dubbing match. Upon a determination of a successful dubbing match, the dubbing matcher 503 sends the translated text with time codes to a voice synthesizer 504, or other text-to-speech converter, to convert the translated text to audio. Further, the voice synthesizer 504 generates audio, which is outputted by an audio/visual ("A/V") device in conjunction with the translated mouth shapes.

If the dubbing matcher 503 determines a failed dubbing match, the dubbing matcher 503 may request that the language translation system 100 retranslate the text to find a text translation with perceived mouth shapes (corresponding to the translated text) that match the displayed mouth shapes (corresponding to the untranslated text). In an alternative aspect, the dubbing matcher 503 may allow for a text modifier 210, as illustrated in FIG. 2, to be used to select and edit words or phrases to semantically equivalent variants that meet the one or more dubbing parameters composed by the parameter composer 206.

In one aspect, a confidence score is generated for each of a plurality of potential retranslations. The language translation system 100 may then iterate (e.g., via a programmatic loop) through each of the plurality of potential retranslations, from the highest to lowest confidence score, until a re-translation is deemed to meet the one or more dubbing parameters.

In an alternative aspect, the dubbing translation configuration 500 may operate in conjunction with a human translator, rather than entirely automatically via a machine translator. For instance, the checker 207 may automatically highlight one or more portions of a translation for editing by a human translator to bring the translation within compliance of the one or more dubbing parameters.

In yet another alternative aspect, the dubbing translation configuration 500 is not limited to receiving an audio input form the audio system 201. For instance, the dubbing translation configuration 500 may receive a script in text form and perform parsing without the speech-to-text converter 203.

Figure 6:
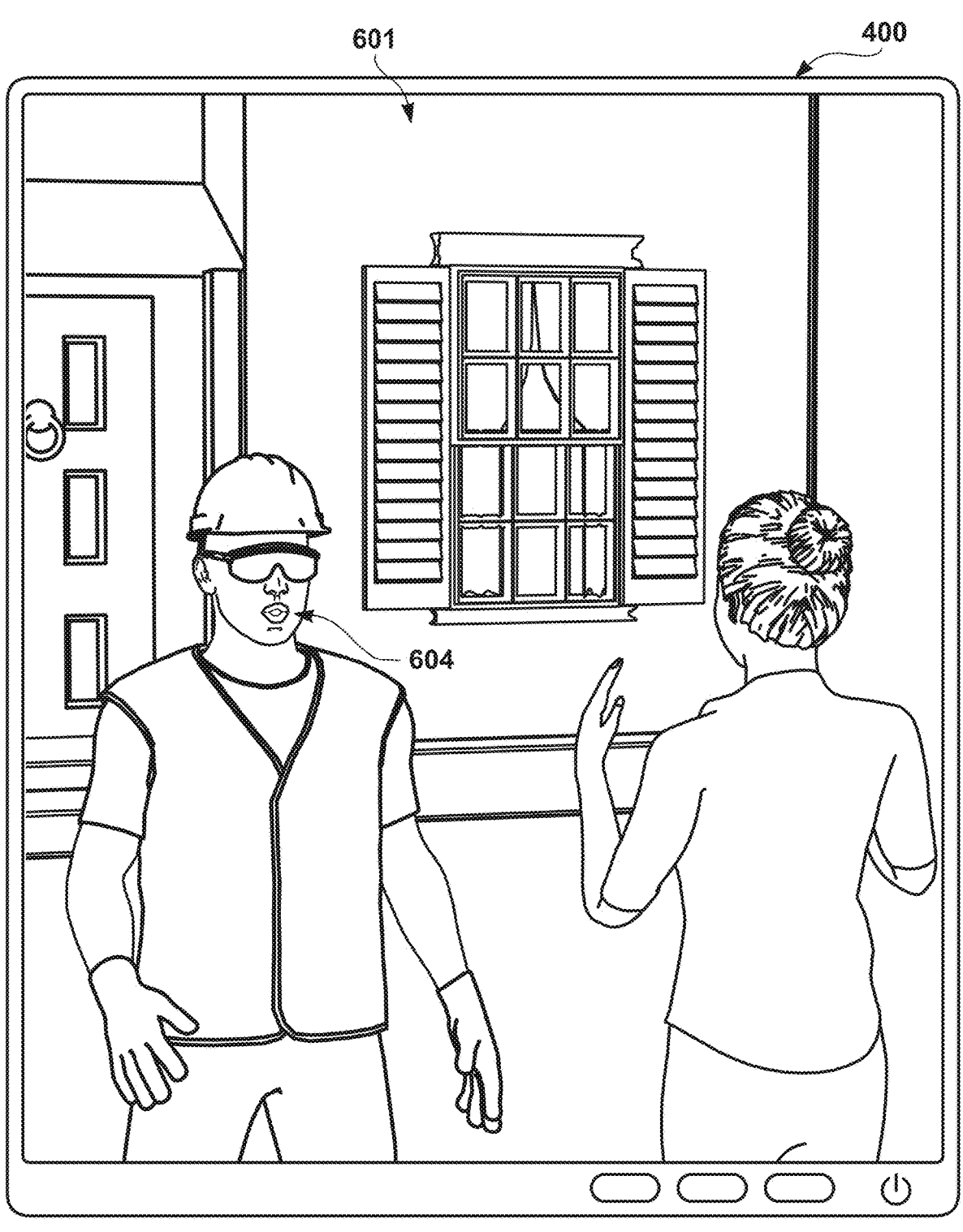
FIG. 6 illustrates an example of a screenshot of media content being displayed by the display device corresponding to a mouth shape for the untranslated content.

FIG. 6 illustrates an example of a screenshot 601 of media content, which is displayed by the display device 400, corresponding to a mouth shape for the untranslated content. For example, a mouth shape 604 corresponding to the sound for the letter "o" may be illustrated. During dubbing, the mouth shape 604 is preserved, but the audio synchronized with the display of the mouth shape 604 is translated.

The language translation may be adjusted to select a word that has a sound that is substantially similar to the sound corresponding to the displayed mouth shape 604. For instance, a sound corresponding to the articulation "m" would correspond to a closed-mouth shape rather than the open-mouth shape 604 illustrated in FIG. 6. Therefore, a translation corresponding to the sound "m" would not have complied with the one or more dubbing parameters. Although sounding different than the vowel "o," a translation corresponding to the vowel "u" would have a mouth shape that appears substantially similar to the vowel "u." Accordingly, a translation using the vowel "u" would comply with the one or more dubbing parameters.

In another aspect, the dubbing translation configuration 500 may enforce specific word translations according to the pre-approved dictionary discussed with respect to FIG. 2. The dubbing translation configuration 500 may automatically use that particular word from the pre-approved dictionary, or phrase containing the word, rather than sending it to the language translation system 100. Alternatively, the language translation system 100 may assign a weighted score to a word that is in the pre-approved dictionary rather than one that is not so that the language translation system 100 is more likely to select the word that is in the pre-approved dictionary.

FIG. 7 illustrates a process 700 that may be used by the dubbing translation configuration 500 to automatically generate a machine language translation as dubbing for media content. At a process block 701, the process 700 receives, with the processor 101 (FIG. 1), audio corresponding to media content. Further, at a process block 702, the process 700 converts, with the processor 101, the audio to text. In addition, at a process block 703, the process 700 concatenates, with the processor 101, the text with one or more time codes and one or more untranslated mouth shape indicia. At a process block 704, the process 700 parses, with the processor 101, the concatenated text into one or more text chunks according to one or more dubbing parameters. Further, at a process block 705, the process 700 automatically translates, with the processor 101, the parsed text from a first spoken language to a second spoken language. At a process block 706, the process 700 automatically generates, with the processor 101, one or more translated mouth shape indicia. Further, at a process block 707, the process 700 determines, with the processor, if the one or more translated mouth shape indicia match the one or more untranslated mouth shape indicia within a predetermined tolerance threshold. Moreover, at a process block 708, the process 700 generates, with the voice synthesizer 504 (FIG. 5), a translated audio output based on the one or more translated mouth shape indicia matching the one or more untranslated mouth shape indicia within the predetermined tolerance threshold.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multipurpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

What is claimed is:

1. At least one non-transitory computer-readable medium carrying instructions that, when executed by a processor, cause the processor to:

receive audio corresponding to media content;

convert the audio to text;

concatenate the text with one or more time codes and one or more untranslated mouth shape indicia;

parse the concatenated text into one or more text chunks when one or more dubbing parameters are met;

automatically translate the one or more text chunks from a first spoken language to a second spoken language;

automatically generate one or more translated mouth shape indicia;

determine whether the one or more translated mouth shape indicia match the one or more untranslated mouth shape indicia within a predetermined tolerance threshold;

generate a translated audio based on the one or more translated mouth shape indicia matching the one or more untranslated mouth shape indicia within the predetermined tolerance threshold;

generate modified media content by placing the translated audio based on the one or more time codes in place of the audio corresponding to the media content; and output the modified media content.

2. The at least one non-transitory computer-readable medium of claim 1, wherein the processor is further caused to replace one or more words in the translated one or more text chunks with one or more semantically equivalent variants based on the one or more translated mouth shape indicia not matching the one or more untranslated mouth shape indicia within the predetermined tolerance threshold.

3. The at least one non-transitory computer-readable medium of claim 2, wherein the processor is further caused to generate one or more replacement translated mouth shape indicia and determine whether the one or more replacement translated mouth shape indicia match the one or more untranslated mouth shape indicia within the predetermined tolerance threshold, the one or more replacement translated mouth shape indicia corresponding to the one or more semantically equivalent variants.

4. The at least one non-transitory computer-readable medium of claim 3, wherein the processor is further caused to generate a second translated audio based on the one or more replacement translated mouth shape indicia matching the one or more untranslated mouth shape indicia within the predetermined tolerance threshold.

5. The at least one non-transitory computer-readable medium of claim 1, wherein the processor is further caused to automatically highlight text in the concatenated text on a display screen if the concatenated text fails to comply with the one or more dubbing parameters.

6. The at least one non-transitory computer-readable medium of claim 1, wherein the processor is further caused to generate a modified translation in the second spoken language of the one or more text chunks in response to a determination that the one or more translated mouth shape indicia do not match the one or more untranslated mouth shape indicia within the predetermined tolerance threshold, and wherein generating the modified translation comprises:

generating a confidence score for each of a plurality of potential modified translations, iterating through each of the plurality of the potential modified translations, from a highest to a lowest confidence score, until a first potential modified translation of the plurality of potential modified translations satisfies the one or more dubbing parameters, and selecting the first potential modified translation of the plurality of potential modified translations as the modified translation.

7. The at least one non-transitory computer-readable medium of claim 1, wherein the processor is further caused to select a word or phrase for inclusion in the translated audio output based on a weighted score assigned to the word or phrase in a pre-approved dictionary.

8. A computing system comprising:

at least one processor; and at least one non-transitory memory carrying instructions that, when executed by the at least one processor, cause the computing system to:

access text corresponding to media content;

determine one or more untranslated mouth shape indicia based on the text;

parse the text into one or more text chunks when one or more dubbing parameters are met;

translate the parsed text from a first spoken language to a second spoken language;

determine one or more translated mouth shape indicia;

compare the one or more translated mouth shape indicia and the one or more untranslated mouth shape indicia based on a predetermined tolerance threshold;

generate a translated audio based on the translated text;

generate modified media content by placing the translated audio in place of an audio corresponding to the media content; and output the modified media content.

9. The computing system of claim 8, wherein comparing the one or more translated mouth shape indicia and the one or more untranslated mouth shape indicia based on the predetermined tolerance threshold comprises determining a match between the one or more translated mouth shape indicia and the one or more untranslated mouth shape indicia within the predetermined tolerance threshold.

10. The computing system of claim 8, wherein the computing system is further caused to replace one or more words in the translated, parsed text with one or more semantically equivalent variants if the one or more translated mouth shape indicia do not match the one or more untranslated mouth shape indicia within the predetermined tolerance threshold.

11. The computing system of claim 10, wherein the computing system is further caused to generate one or more replacement translated mouth shape indicia and determine if the one or more replacement translated mouth shape indicia match the one or more untranslated mouth shape indicia within the predetermined tolerance threshold, the one or more replacement translated mouth shape indicia corresponding to the one or more semantically equivalent variants.

12. The computing system of claim 11, wherein the computing system is further caused to generate a second translated audio based on the one or more replacement translated mouth shape indicia matching the one or more untranslated mouth shape indicia within the predetermined tolerance threshold.

13. The computing system of claim 8, wherein the computing system is further caused to automatically highlight text in the accessed text on a display screen if the accessed text fails to comply with the one or more dubbing parameters.

14. The computing system of claim 8, wherein the computing system is configured to generate a modified translation in the second spoken language of the parsed text in response to a determination that the one or more translated mouth shape indicia do not match the one or more untranslated mouth shape indicia within the predetermined tolerance threshold, and wherein generating the modified translation comprises:

generating a confidence score for each of a plurality of potential modified translations, iterating through each of the plurality of the potential modified translations, from a highest to a lowest confidence score, until a first potential modified translation of the plurality of potential modified translations satisfies the one or more dubbing parameters, and selecting the first potential modified translation of the plurality of potential modified translations as the modified translation.

15. The computing system of claim 8, wherein the computing system is further caused to select a word or phrase for inclusion in the translated audio based on a weighted score assigned to the word or phrase in a pre-approved dictionary.

16. A computer-implemented method comprising:
accessing text corresponding to media content;
determining one or more untranslated mouth shape indicia based on the text;
parsing the text into one or more text chunks when one or more dubbing parameters are met;
translating the parsed text from a first spoken language to a second spoken language;
determining one or more translated mouth shape indicia;
comparing the one or more translated mouth shape indicia and the one or more untranslated mouth shape indicia based on a predetermined tolerance threshold;
generating a translated audio based on the translated text;
generate modified media content by placing the translated audio in place of an audio corresponding to the media content; and
outputting the modified media content.

17. The computer-implemented method of claim 16, wherein comparing the one or more translated mouth shape indicia and the one or more untranslated mouth shape indicia based on the predetermined tolerance threshold comprises determining a match between the one or more translated mouth shape indicia and the one or more untranslated mouth shape indicia within the predetermined tolerance threshold.

18. The computer-implemented method of claim 17, further comprising replacing one or more words in the translated, parsed text with one or more semantically equivalent variants if the one or more translated mouth shape indicia do not match the one or more untranslated mouth shape indicia within the predetermined tolerance threshold.

19. The computer-implemented method of claim 18 further comprising generating one or more replacement translated mouth shape indicia and determining if the one or more replacement translated mouth shape indicia match the one or more untranslated mouth shape indicia within the predetermined tolerance threshold, the one or more replacement translated mouth shape indicia corresponding to the one or more semantically equivalent variants.

20. The computer-implemented method of claim 16 further comprising generating a modified translation in the second spoken language of the parsed text in response to a determination that the one or more translated mouth shape indicia do not match the one or more untranslated mouth shape indicia within the predetermined tolerance threshold, and wherein generating the modified translation comprises:
generating a confidence score for each of a plurality of potential modified translations,
iterating through each of the plurality of the potential modified translations, from a highest to a lowest confidence score, until a first potential modified translation of the plurality of potential modified translations satisfies the one or more dubbing parameters, and
selecting the first potential modified translation of the plurality of potential modified translations as the modified translation.

\* \* \* \* \*